May 20, 1930.  W. HUBBARD  1,759,118
MACHINE FOR SHAPING WOODEN BLOCKS
Filed Oct. 5, 1927  3 Sheets-Sheet 1
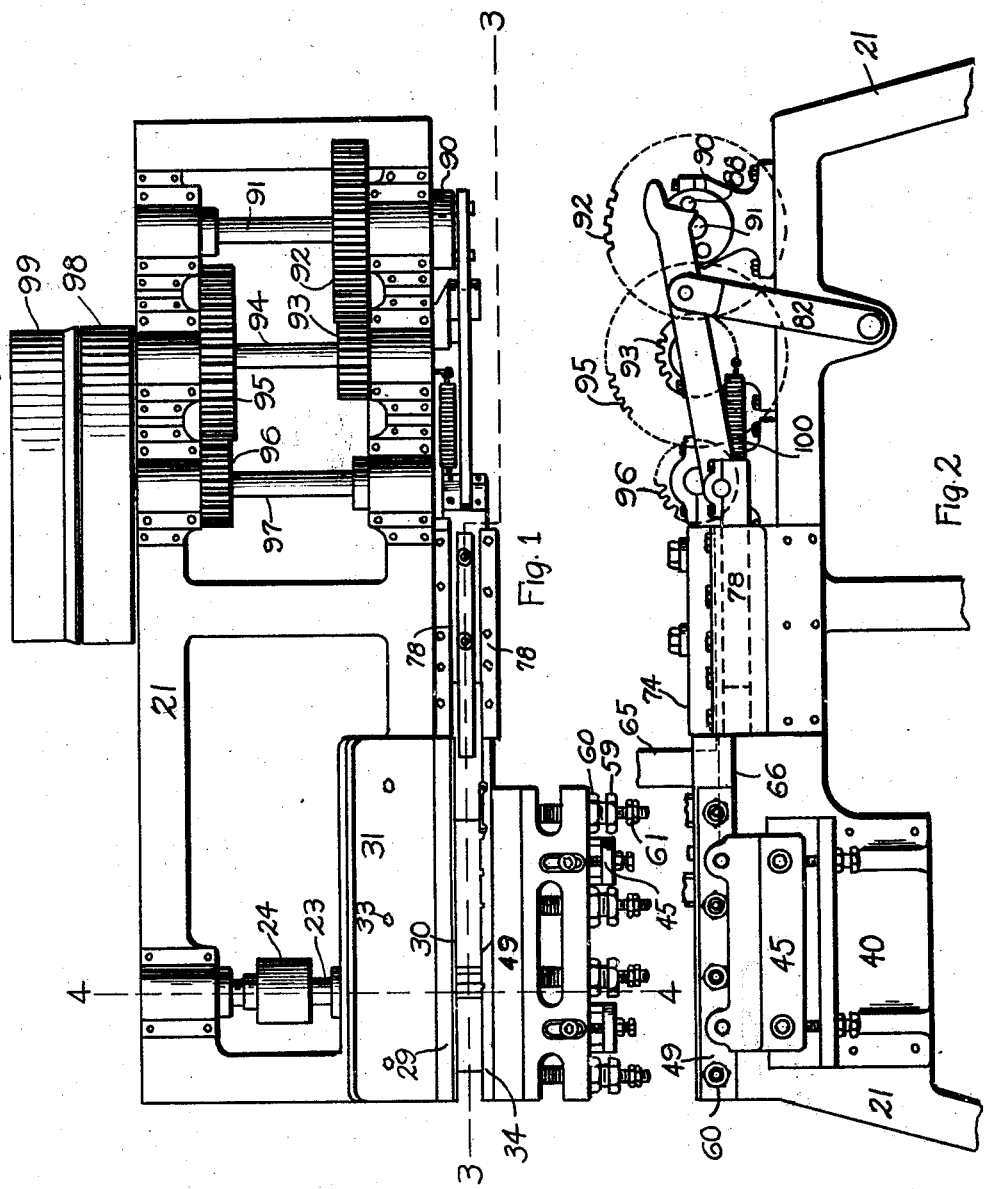
Inventor
WILLIAM HUBBARD
By Martin & Rendell
Attorneys

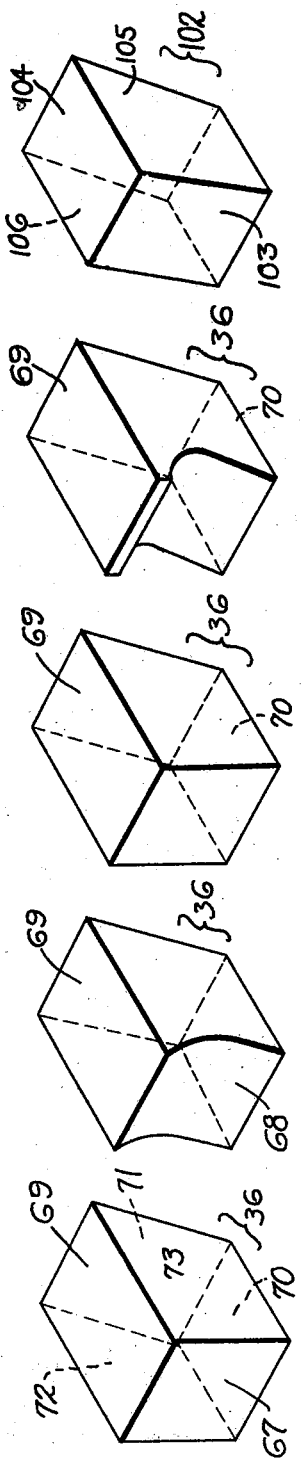

Inventor
WILLIAM HUBBARD
By Martin & Rendell
Attorneys

Patented May 20, 1930

1,759,118

UNITED STATES PATENT OFFICE

WILLIAM HUBBARD, OF DOLGEVILLE, NEW YORK, ASSIGNOR TO HUBBARD HEEL COMPANY, INC., OF DOLGEVILLE, NEW YORK, A CORPORATION

MACHINE FOR SHAPING WOODEN BLOCKS

Application filed October 5, 1927. Serial No. 224,252.

My present invention relates to a machine for shaping or grooving blocks of wood and particularly to a machine especially adapted to shape or groove the front or breast of the wooden blocks used in the manufacture of the heels of ladies' shoes.

The purpose of my invention is to provide a machine of the character described which is of new and improved construction and well adapted to shape such blocks of wood rapidly, accurately, neatly and safely.

A further object of my invention is to provide a machine of the type described wherein a constantly maintained row of the wooden blocks or blanks is continually, that is step by step advanced towards and past a rotary shaping tool with said blocks held in the proper position relative to said shaper to groove or shape the blocks as they are pushed past the shaper; and further to provide in such a machine a combination and arrangement of parts such that the blocks will be securely held in proper position and from displacement when engaged by the shaping tool and to have the blocks so held that the entire face of the block or breast of the heel block to be shaped may be engaged by the knives of the shaper and to have the row of blocks held between oppositely disposed guides yieldingly tensioned relative to each other so that the blocks may be advanced along the guides with a minimum of power but with a maximum of rigidity; further to have the guides or one series thereof adjustable to adapt the machine for convenient use upon different sizes of blocks and to have the shaping tool and the guideways adjustable relative to each other so that the machine may be adjustable to different kinds of work and so that the groove may be maintained in the proper accurate position without stopping to adjust the position of the cutting blades in the shaping tool.

A further object of this invention is to provide a machine of the class described wherein the blocks or blanks to be shaped fall or descend successively through a chute onto a raised table or platform spaced the proper distance below the beginning end of the said guides and to have the guides at that point spaced far enough from the blocks to allow the blocks to fall freely to said support and to have said guides thereafter spaced closely enough together so that as the lowermost block from the chute is pushed laterally through the guideway formed by the said guides, the blocks in the row will be held tightly enough to prevent displacement thereof as the blocks come into engagement with the cutter but with said holding of the blocks by the guides still loose or yielding enough to allow of the progressive pushing forward of the row of blocks; and further preferably to provide upon one or both of the said guides longitudinally extending slightly projecting ribs which will aid in holding the blocks in position between the guides while still allowing the blocks to be pushed forward.

It is a further particular purpose to provide a machine especially adapted to operate safely, accurately and effectively upon relatively short blocks of wood such as shoe heels where the length of the surface to be shaped is so short that it cannot be supported by the bed or platform of the machine in front of or to the rear of the cutter and where the cutter may have to engage the entire width of the bottom of the block so that the block cannot be supported at either of the sides of the cutter.

Further purposes and objects of my invention will appear from the specification and claims herein.

The machine illustrated in the drawings and described herein is particularly adapted to groove the breast of wooden heels and the blocks of wood shown as being operated upon in the machine are blocks from which wooden heels are to be formed. It will be understood, however, that my invention is not limited to a machine for shaping or grooving such wooden heels, but is adapted widely for use whenever relatively small blocks of wood are to be shaped usually to a curve or groove.

Fig. 1 is a top or plan view of a machine embodying my invention.

Fig. 2 is a front side view of the machine with the lower part of the frame cut away.

Fig. 3 is a longitudinal vertical section on line 3—3 of Fig. 1.

Fig. 6 is a perspective view of a block of wood from which is to be ultimately formed a heel of the so-called half Louis XV type.

Fig. 7 is a perspective view of the said block after it has been grooved or shaped by my machine.

Figs. 8 and 9 are similar perspective views of a block before and after being operated upon by my machine, said block being shaped to form a so-called full Louis XV heel.

Figs. 10 and 11 are similar perspective views of a block before and after being operated upon by my machine, said block being shaped to form a so-called Cuban heel.

Figure 12:
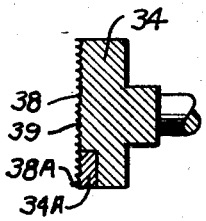
Fig. 12 is a transverse vertical sectional view of the front guide, on an enlarged scale.

Referring to the drawings in a more particular description it will be seen that the machine comprises a suitable frame 21 including a main raised bed 22 of open form and generally rectangular in shape. Near the left hand end of this main bed 22 as seen in Figs. 1 to 3 there is suitably mounted the shaft 23 carrying a pulley 24 between the front and back of the bed of the machine and upon the end of said shaft projecting forwardly from the front side of the bed of the machine is the rotary shaper designated as a whole by the numeral 25. This shaper tool may be of any desired form but is shown as appears particularly in Fig. 4 as composed of the usual spaced blade holders 26—26 with blades 27 sliding in slots in said blade holders and securely fixed in position by the usual tightening nut 28 on the end of the shaper shaft 23.

Above the inner edge of the shaping tool and extending horizontally for some distance along the front of the machine to the right and to the left of said shaper as the parts are seen in Figs. 1–3 there is provided and stationarily held the fixed guide 29. This guide has its front face 30 in a vertical plane and is preferably slightly roughened by very small longitudinally extending scratches or serrations placed therein. This fixed guide 29 is preferably formed as a long strip of proper metal secured to the front face of the upstanding web of a bracket 31 as by means of countersunk screws 32. The horizontal web of this long bracket is secured as by suitable bolts 33 to the front or right hand part of the bed of the machine as appears more particularly in Fig. 4.

Figure 4:
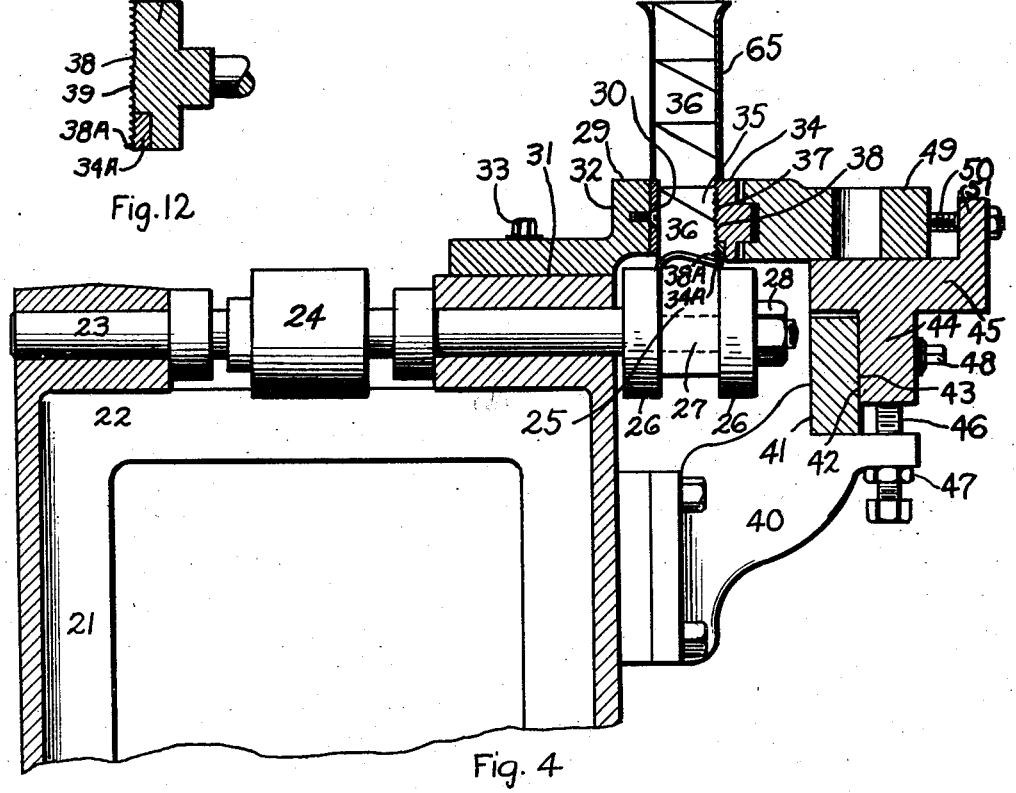
Fig. 4 is a transverse vertical sectional view on an enlarged scale through the machine on line 4—4 of Fig. 1 particularly showing the rotary shaping tool and the block of wood being operated upon by the tool and the means for moving the adjustable guide.

Immediately above the shaping tool 25 and in front of and spaced from the fixed guide 29 there is provided the forward guide 34 substantially parallel with the back or fixed guide 29 and substantially equal in length thereto. The space between the front guide and the back or fixed guide constitutes the guideway 35 along which the heel blanks 36 or other blocks of wood are to be pushed in a continuous line in a manner hereinafter described. This front or forward guide 34 has on its rear or active surface 37 a plurality of longitudinally extending outwardly projecting ridges 38 which bite more or less into the wooden heel blanks 36 as said blanks are progressed through the guideway and aid greatly in preventing any displacement or upward movement of the heel blanks when they are brought into engagement with the knives of the rotary shaper. Preferably the ridges will be formed as indicated in Figs. 4 and 12 by cutting semi-circular grooves 39 into the rear surface 37 of the guide 34 so as to cause the ridges 38 to be relatively sharp or thin at their outer edge and much thicker at their base. Preferably also the bottom ridge 38$^a$ on the said guide will be higher or will extend farther into the guideway 35 than do the rest of the ridges. A convenient form of accomplishing this is, as shown in Figs. 4 and 12, to have the lower rear part of said guide 34 formed as a separate part 34$^a$. This separate part has thereon the high ridge 38$^a$, and usually one or perhaps two of the ordinary ridges 38 and is fastened to the front guide 34 in any convenient way as by countersunk screws. This detail of construction enables me to provide the desired high ridge at the bottom edge of the front guide without having to cut away so much metal. Another advantage of this removable section is that when this high ridge becomes worn down or damaged a new section can be inserted more economically than could be a whole guide 34.

This front guide 34 is mounted to be spring-tensioned or yieldingly-tensioned in its engagement with the blanks 36 and also is adjustable horizontally and vertically by means that will now be described. Rigidly projecting from the frame 21 below the rotary shaper 25 are several strong brackets 40 carrying a longitudinally extending beam 41 having a front vertical face 42. Slidingly mounted against the face 42 of the beam 41 is placed the rear vertical surface 43 of the vertical web 44 of rest 45. Adjusting screws 46 vertically mounted in projections on the brackets 40 have their upper ends bearing against the bottom of the web 44 of the rest 45 and provide for screw-threaded adjustment of the rest 45 vertically. Lock nuts 47 are placed upon the screws 46 and clamping bolts 48 of conventional form extend through slots in the web 44 into the beam 41 to maintain the rest in desired vertical position.

The guide holder 49 is placed upon the upper surface of the rest 45 and is adapted to be adjusted thereon by sliding horizontally towards and from the guideway 35. The guide holder 49 carries at its rear face the forward guide 34 already mentioned. As will appear more particularly from Figs. 4 and 5 the guide holder 49 may be set rearwardly or toward the guideway 35 by means of adjusting bolts 50 mounted in ears 51 upstanding from the forward edge of the rest 45 with the rear ends of said bolts engaging the forward edge of the guide holder. The guide holder is fixed in place and securely fastened to the rest 45 by means of clamping bolts 52 projecting down through elongated slots 53 in the guide holder into the rest 45.

Figure 5:
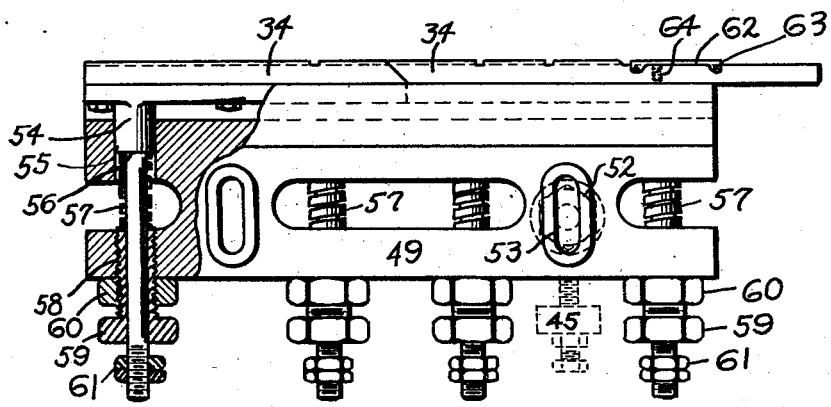
Fig. 5 is a plan view partly sectioned of the mechanism for yieldingly tensioning and horizontally adjusting the front guide.

Preferably the forward adjustable guide 34 is formed in two sections overlapping at their meeting ends as seen in Fig. 5. As the sections are similar only one needs to be described in detail. Each section of the guide is provided with two horizontal and forwardly extending circular posts 54 sliding in a horizontal smooth opening 55 in the rearward portion of the guide holder. A short distance from its rear end each post is reduced in diameter providing a forwardly facing shoulder 56 against which bears the rear end of a coiled spring 57 encircling the rear portion of the reduced part of the post. The post extends forwardly for some distance beyond the front edge of the guide holder and is provided forward of said spring with a sleeve 58 slidingly mounted on said post but screw-threaded into the front part of the guide holder. At the forward end this sleeve is provided with an angular head 59 for the rotation of said sleeve by means of a wrench. Between the head 59 and the adjusting front face of the guide holder is placed a lock nut 60. The front end of each post projects forwardly of the head 59 and is screw-threaded to receive two nuts 61. These nuts 61 are set to establish the rearward limit of travel of the front guide under the spring tension of the springs 57 but ordinarily even the inner nut 61 is spaced from the adjacent face of the head 59 when the guide 34 is in engagement with the heel blanks which normal working position of the parts is that shown in Figs. 1 and 5. By rotation of the sleeve 58 the spring 57 can be compressed or released as needed to provide the desired tension of this forward guide against the row of blanks in the machine.

Preferably there will be as shown in Fig. 5 at the beginning or right hand end of the guide 34 a short preliminary guide 62 pivotally mounted upon the guide 34 at 63 and having its free end tensioned to spring rearwardly against the heel blanks by means of a spring 64.

At the beginning or right hand end of the guideway 35 formed by the rear guide 29 and the front adjustable guide 34 there is placed and suitably supported an upstanding chute 65 adapted to deliver the blanks 36 by gravity down onto the platform 66 provided at this part of the machine. The platform 66 is adjustable vertically and serves to establish the horizontal plane along which the lower face 67 of the heel blank 36 will travel between the guides towards the rotary shaper.

In the drawings I have illustrated the machine as being used to groove or shape the front or breast side 68 of a heel of the type known as the half Louis XV. The block used for this purpose as shown in Fig. 6 is rectangular in cross-section and its face 67 which is to be grooved by the machine to form the convex face or breast 68 of the heel as shown in Fig. 7 is at right angles to the length of the blank or block 36. The block 36 will be delivered into the guideway by the chute with the face 67 of the block at the bottom or towards the platform 66. Accordingly the lower part of the chute 65 will be rectangular of a size just enough larger than the blocks or blanks 36 in cross-section or at the face 67 to allow said blocks to slide easily down through the chute. As seen in Fig. 6 the block to be shaped has a long rectangular face 69 and a shorter rectangular face 70 connected by a rectangular but slanting face 71. The blocks will be fed into the chute with the long side 69 to the rear so that said long side will come into contact with the rear or fixed guide 29 while the shorter opposite side 70 of the block is to the front of the machine and will engage the front adjustable guide 34. As the row of blocks in the guideway and the stack of blocks in the chute are seen in Fig. 3 the short side 70 is toward the observer and in a vertical position and above this surface of each block there appears the slanting face 71. The long side 69 and the short side 70 of each block or blank 36 are of sufficient length to maintain the blocks in upright position in the chute notwithstanding the slanting face 71 at the top of the blank. The remaining parallel sides 72 and 73 of the blank engage the right and left hand interior sides of the chute and prevent any displacement or twisting of the block laterally as it descends onto the platform. The means for supporting and vertically adjusting the platform 66 consist of two vertically arranged members 107 dove-tailed in shape and slidingly set into the front of the rear guide 29 and connected above said guide by a cross head 108 through which extends a vertical upright rod 109 having screw-threaded engagement with the rear guide 29 and controlled by a hand wheel 110 at its top with collars 111 and 112 fixed to said rod respectively above and below said cross head. The platform 66 is fastened to the front of the lower ends of said upright members 107.

Extending to the right of the chute 65 and in line with the guideway 35 formed by the front and rear guides 29 and 34 respectively there is provided the ram 74. This ram is reciprocated horizontally back and forth so as to push to the left in the machine the block or blank 36 resting upon the platform 66 after it has been fed down from the chute 65. At each forward motion of the ram 74 a blank is pushed from below the chute to the left through the beginning of the guideway and consequently a row of such blanks is thus step by step pushed longitudinally through the guideway between the two guides 29 and 34. As soon as the block is pushed forwardly from beneath the chute it is grasped by considerable tension between the rear guide 29 and the front spring-tensioned guide 34 due to these guides being a little closer together than is the case directly under the chute and due also to the fact that the ridges 38 on the front guide begin on a line to the left of the chute. The introductory swinging portion 62 of the forward guide engages the forward side of the blank first and by its spring tension and the swinging action of its left hand end presses the blanks against the rear guide and guides the blanks readily to the beginning of the ridges 38 of the main part of the front guide 34.

The ram 74 has its forward end rectangular and of less width than the block to be operated thereto so that the ram may advance between the front and rear guides in all positions to which the front or adjustable guide may be set.

The ram proper 74 is mounted upon a slider 75 with longitudinal adjustment between the ram and the slider as by means of a plurality of clamping bolts 76 extending down through elongated slots in the right hand half of the ram 74 into the slider 75. The slider 75 is mounted upon a horizontal surface 77 provided upon the bed 22 and is held to longitudinal movement thereon by opposite side keepers 78 overhanging the opposite upper edges of the slider. The left hand end of the ram 74 projects beyond that end of the slider 75 so that the ram may enter into the guideway 35 the proper distance without the slider 75 coming in contact with the platform 66.

The slider 75 is given its proper reciprocating motion and also is preferably given a quick return motion so as to utilize most of the time in working motions of the machine. As shown in the drawings the mechanism for imparting such quick return reciprocating motion consists of a link 79 pivoted at its left hand end upon pivot 80 suitably mounted in a horizontal position upon the right hand end of the slider 75. About two-thirds of the way towards its right hand end the link 79 is pivotally connected as at 81 to the upper forked end of upstanding arm 82 which has its lower end pivotally mounted as at 83 upon a suitable bracket 84 depending from the bed of the machine. The right hand end of the link 79 has a substantially upright pin-engaging surface 85 and thereabove the link is extended further to the right as a finger 86 providing downwardly facing pin-engaging surface 87. As shown in Fig. 3 these pin-engaging surfaces are engaged successively by the two equally spaced pins 88 and 89 projecting from the face of disk wheel 90 which is mounted to overhang the forward part of the machine by being mounted upon the forward end of shaft 91 on suitable bearings provided at the front and rear of the main bed of the machine. Suitable rotation is imparted to the disk wheel 90 through a train of gears consisting of gear 92 on shaft 91, with said gear 92 engaging a small gear 93 on counter shaft 94 which in turn carries large gear 95 driven by small gear 96 on shaft 97 which latter shaft carries the usual tight and loose pulleys 98 and 99 respectively to receive a belt not shown.

It will be seen that assuming the disk wheel 90 is given an anticlockwise motion, one of the pins as 88 will engage the upright surface 85 of the link 79 as the parts are seen in Figs. 2 and 3 and quickly move said link to the left imparting a powerful working stroke to the ram 74. During this motion the link 79 will be first raised and then lowered somewhat due to its having to follow the circle determined by the arm 82 and during such upward and downward motion the pin 88 will slide along the upright face 85 of the link 79. As this pin 88 continues its rotation and then moves downward it will slide off of the lower end of face 85 and thereupon the ram, the slider and the link 79 will be very quickly moved to the right under the impulse of tension spring 100 connected at its opposite ends to the slider 75 and suitably hooked upon the bed of the machine. During such movement to the right of the link 79 its right hand end will be moved in an arc first slightly up and then slightly downwardly and will arrive at the further side of the disk wheel 90 in time to be engaged by the other pin 89 upon the disk wheel 90 whereupon a similar working stroke will be imparted to the ram and upon this pin leaving the face 85 a quick return will be enforced through spring 100 bringing the link again into engagement with the first pin 88.

The operation of the machine has been in the main explained as the description of the parts has been made. When the machine is in operation the heel blocks or other blocks of wood will descend by gravity through the chute 65 and will be one at a time pushed into the guideway by the ram 74. On the return motion of the ram the ram clears the space below the chute thus allowing another block to descend to the platform 66 to be engaged by the next forward or working movement of the ram 74. As these movements continue it will be obvious that the continuous line of blocks will be pushed by recurrent motions of the ram 74 through the guideway and at each forward motion a block or parts of two blocks will be engaged by the shaping tool and trimmed down or shaped to the desired extent according to the adjustment of the machine. As the machine continues to be operated the blocks that have been so shaped pass beyond the shaping tool but still are gripped between the guide for the length of three or four blocks, namely until the end of the guideway. It will thus be seen that three or four blocks both in front and behind the shaping tool help to exert a tension or hold upon the block actually being engaged by the shaping tool. As the blocks progress through the guideway they are in immediate contact with each other and so the face of the block being shaped is supported for its whole width right up to the shaper so that there is no opportunity for the shaper to sliver off pieces of a block as is the case in a machine where blocks are put past a shaper without another block in immediate contact with its edge being shaped. It is well known that in machines of this character the last edge of an unsupported piece of wood is always subject to being torn or slivered by the shaper.

The shallow grooves cut or pressed into the bottom surface 67 of the heel blank 36 of a half Louis XV or full Louis XV type of heel by the ridges 38 are not objectionable as they are obliterated when the heel blank has its bottom surface finished off by a later operation in the manufacture of the heels.

In prior machines used to shape the front or breast surfaces of wooden heels the heel blanks were placed separately between clamps in a sliding carriage and this carriage was moved by hand past the rotating shaper. Placing of the blocks in the carriage required the workman to put his hand within a very short distance, actually about two inches, from the rotating blades with the result that many serious accidents happened through the use of those machines either in placing the blocks in the machine or moving the blocks past the shaper. In the machine embodied in my present invention it will be noticed that there is no danger of the operator being injured by his getting his hand near the rotating shaper tool for the reason that the workman does not have to place the blocks near the shaper nor move his hands past or near the rotating shaper. In my machine the operator's work consists simply in keeping the chute filled with blocks and the machine automatically does the rest of the work.

In the heels of the half Louis XV type or the full Louis XV type the front or breast 68 of the completed heel is concave when viewed from the side and consequently the blanks for these types of heels are placed in the chute and in the machine as already described. As will be seen from Fig. 11 the Cuban heels have their front or breast surface 101 concave when viewed horizontally or from above. The shaping of the blanks 102 shown in Fig. 10 for these Cuban heels will be therefore accomplished by the blanks being turned one-quarter of the way around so that the curved cutting edge of the blade will cut the forward face 103 of these blanks to a curve concave as viewed from above as shown in Fig. 11. Furthermore, as indicated in Figs. 10 and 11 a Cuban heel has its forward surface or breast 110 slant forward as a whole. The blanks 102 accordingly are formed with the front face 103 at the necessary slanting angle or at greater than a right angle relative to the long top surface 104 of the blank. These blanks accordingly when run through the machine will slant instead of standing straight and the two sides 105 and 106 of the blank will be engaged by the guides of the guideway. The slight indentations cut by the ridges on the forward guide will be obliterated after this breast shaping operation by a subsequent shaping or rounding of the sides and back of the heel.

What I claim as new and desire to secure by Letters Patent is:

1. In a machine for shaping the entire width of the bottom of relatively short wooden blocks, the combination of a horizontally arranged rotary shaper having blades adapted to engage the width of the blocks, oppositely disposed upstanding side guides adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, and means for pushing said row of blocks forwardly past the shaper.

2. In a machine for shaping the entire width of the bottom of relatively short wooden blocks, the combination of a horizontally arranged rotary shaper having blades adapted to engage the width of the blocks, oppositely disposed upstanding side guides, one of them being yieldingly tensioned and the two being adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, and means for pushing said row of blocks forwardly past the shaper.

3. In a machine for shaping the entire width of the bottom of relatively short wooden blocks, the combination of a horizontally arranged rotary shaper having blades adapted to engage the width of the blocks, oppositely disposed upstanding side guides relatively adjustable and adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, and means for pushing said row of blocks forwardly past the shaper.

4. In a machine for shaping the entire width of the bottom of relatively short wooden blocks, the combination of a horizontally arranged rotary shaper having blades adapted to engage the width of the blocks, oppositely disposed upstanding side guides yieldingly tensioned, relatively adjustable and adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, and means for pushing said row of blocks forwardly past the shaper.

5. In a machine for shaping the entire width of the bottom of relatively short wooden blocks, the combination of a horizontally arranged rotary shaper having blades adapted to engage the width of the blocks, oppositely disposed upstanding side guides adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper and means for pushing said row of blocks, a chute for feeding the block by gravity into position between the guides at the beginning of the row of blocks, and a horizontal platform beginning beneath said chute and extending below the first part of the side guides and terminating short of the cutter for positioning said blocks until they are grasped by the side guides.

6. In a machine for shaping the entire width of the bottom of relatively short wooden blocks, the combination of a horizontally arranged rotary shaper having blades adapted to engage the width of the blocks, oppositely disposed upstanding side guides adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, and means including a horizontally reciprocating ram recurrently engaging the rear of the row of the blocks for pushing said row of blocks forward past the shaper, said means including mechanism for imparting a more rapid movement to said ram during its retracting stroke than during its pushing stroke.

7. In a machine for shaping the entire width of the bottom of relatively short wooden blocks, the combination of a horizontally arranged rotary shaper having blades adapted to engage the width of the blocks, oppositely disposed upstanding side guides adapted to engage the longitudinal sides of said blocks and form a guideway through which the blocks may be pushed in a continuous line into engagement with and past the shaper while the blocks are being held solely by said guides from lateral and vertical displacement when brought into engagement with said shaper, said upstanding side guides being provided with longitudinally extending ridges adapted to form grooves in the sides of the block to aid in preventing displacement of said blocks from the row when engaged by said shaper, and means for pushing said row of blocks forwardly past the shaper.

In witness whereof I have affixed my signature, this 2nd day of September, 1927.

WILLIAM HUBBARD.